(12) United States Patent
Harry et al.

(10) Patent No.: US 7,480,896 B2
(45) Date of Patent: Jan. 20, 2009

(54) LIGHTWEIGHT METHODS FOR STORING WORK IN PROGRESS IN A SOURCE CODE CONTROL SYSTEM

(75) Inventors: Brian D. Harry, Chapel Hill, NC (US);
Craig A. Harry, Wake Forest, NC (US);
Justin E. Pinnix, Raleigh, NC (US);
Douglas T. Neumann, Cary, NC (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 10/790,605

(22) Filed: Mar. 1, 2004

(65) Prior Publication Data

US 2005/0193374 A1     Sep. 1, 2005

(51) Int. Cl.
*G06F 9/44* (2006.01)
(52) U.S. Cl. .................. 717/120; 717/121; 717/122
(58) Field of Classification Search .............. 707/1, 707/10, 203; 717/120, 121, 122
See application file for complete search history.

(56) References Cited

U.S. PATENT DOCUMENTS

| | | | |
|---|---|---|---|
| 5,752,245 A * | 5/1998 | Parrish et al. | 707/10 |
| 5,805,889 A * | 9/1998 | Van De Vanter | 717/107 |
| 5,835,770 A | 11/1998 | Shum et al. | |
| 6,353,447 B1 | 3/2002 | Truluck et al. | |
| 6,385,768 B1 * | 5/2002 | Ziebell | 717/121 |
| 6,671,716 B1 | 12/2003 | Diedrichsen et al. | |
| 7,272,625 B1 * | 9/2007 | Hannel et al. | 709/200 |
| 2003/0033590 A1 * | 2/2003 | Leherbauer | 717/122 |
| 2003/0163509 A1 | 8/2003 | McKean et al. | |

OTHER PUBLICATIONS

Sarma, Anita; Noroozi, Zahra; van der Hoek, Andre; "Palantir: Raising Awareness among Configuration Management Worksapces", 2003, IEEE, retrieved Jan. 31, 2008.*
Lin, Yi-Jing; Reiss, Steven P.; "Configuration Management with Logical Structures", 1996 IEEE, retrieved Jan. 31, 2008.*
Ben Loh, et al., The Progress Portfolio: Designing Reflective Tools for a Classroom Context, CHI 98, 1998, pp. 627-634, Los Angeles, California, USA.

* cited by examiner

*Primary Examiner*—Mary Steelman
*Assistant Examiner*—Philip R. Wang
(74) *Attorney, Agent, or Firm*—Amin, Turocy & Calvin, LLP

(57) ABSTRACT

The present invention relates to a system and methodology to facilitate software development activities via the concept of "Shelving" which provides an improved alternative to conventional branching technologies in certain scenarios. In one aspect, a software development system is provided. The system includes a shelving component that captures a current state of an intermediate software design. A version control component processes the intermediate design as if the intermediate design were a completed software design.

21 Claims, 8 Drawing Sheets

LIGHTWEIGHT METHODS FOR STORING WORK IN PROGRESS IN A SOURCE CODE CONTROL SYSTEM

TECHNICAL FIELD

The present invention relates generally to computer systems, and more particularly to a system and method that captures a current state or a private workspace and archiving the workspace in a version control system without performing a formal commit or check-in process in the version control system.

BACKGROUND OF THE INVENTION

Organizations involved in software development typically employ a source code control (SCC) system for managing source code assets being produced by software developers. These systems provide three principle benefits to these organizations:
1. They serve as a central repository for storing and securing electronic assets being created in an organization.
2. They retain historical information regarding how electronic assets have evolved over time and provide access to historical versions of these assets.
3. They provide a mechanism for individual developers to share their work with other team members.

In the course of using the system for the third listed benefit, individual contributors generally work with one or more files in a private workspace to achieve the objective of their current task. When that objective is met, modifications are submitted to the SCC system whereby they are made available to other team members. It is common practice for individuals to not submit their work to the SCC system until it has reached a level of stability that makes it suitable for other team members to consume. Until that time, their work remains in a private workspace that does not influence the work of other team members.

As long as this work remains in a private workspace, however, it generally does not benefit from any of the aforementioned benefits of SCC systems. Still, there are many situations where developers may desire these benefits without assuming the risk of submitting unfinished work for common consumption by the team. Several such situations are as follows:
1. Developers may need to halt work-in-progress to assume a higher priority task. In such a case, it is desirable to restore unmodified versions of files to the private workspace while archiving the current set of modifications in a manner that can be restored at a later time.
2. Developers may desire to use the SCC system to create a backup of current work in progress in the event that a system failure causes changes in the private workspace to be lost.
3. Developers may desire to checkpoint current work in progress that has reached a notable level of stability yet is still not ready for consumption by the rest of the team.
4. There may be a need to share work in progress with a team member who is willing to assume the higher level of risk associated with consuming the work in a non-final state.
5. There may be a need to transfer work in progress to another team member who is taking over the work objective from the current developer.
6. There may be a need to transfer work in progress to another private workspace where it will be more convenient to continue the work.

Current SCC systems can accomplish some of these goals through the parallel development mechanisms associated with branching. Branching, however, is a complicated process that greatly increases the amount of work for both users and administrators. This work involves the process of setting up new branches for the execution of all work as well as the process of merging completed work from the new branch to an integration branch where it becomes available for general consumption. For developers, this work is superfluous to their stated goal of creating new software. Branching also has the drawback of complicating the structure of the SCC repository and over time makes it significantly more difficult to work with.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for archiving software development works in process within a version control system while mitigating downside effects from conventional branching approaches. This includes the concept of "Shelving," whereby a user can arbitrarily choose to submit work in progress to a centralized or distributed repository for placement "on the shelf." Work that is shelved is generally subject to similar storage and backup features associated with work that has been fully submitted or "checked in." However, work that is shelved maintains short-term historical context that is highly desired for various work in progress scenarios. Namely, shelving provides a process for creating temporary checkpoints of semi-stable or interesting versions of the work. Also, shelving can be employed for sharing work with other developers who are also granted access to the shelved items. In this manner, software development speed and efficiency can be improved.

When deciding to shelve work, a developer can determine whether to have files in a private workspace restored to their unaltered versions, or to preserve the modified files in the workspace. For situations where the shelve operation is being performed so that the developer may switch from current work objectives to another objective, it may be desirable to restore the unaltered files. This allows the developer to save modifications for the various objectives they may pursue which are many times distinct from one another, thus enhancing the ability of the version control system to preserve suitable context for the work when it is submitted to the repository.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate software development activities via the concept of "Shelving" which provides an improved alternative to conventional branching technologies in certain scenarios. In one aspect, a software development system is provided. These systems can be employed for version control and tracking of source code, for example. The system includes a shelving component that captures a current state of an intermediate software design such as a preliminary version of source code. A version control component processes the intermediate design as if the intermediate design were a completed software design. In this manner, software development that was normally held back until much later stages in development cycles can be shared to facilitate overall team goals. Also, components and processes are provided to restore the state of previous development versions, if desired.

As used in this application, the terms "component," "object," "shelf space," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
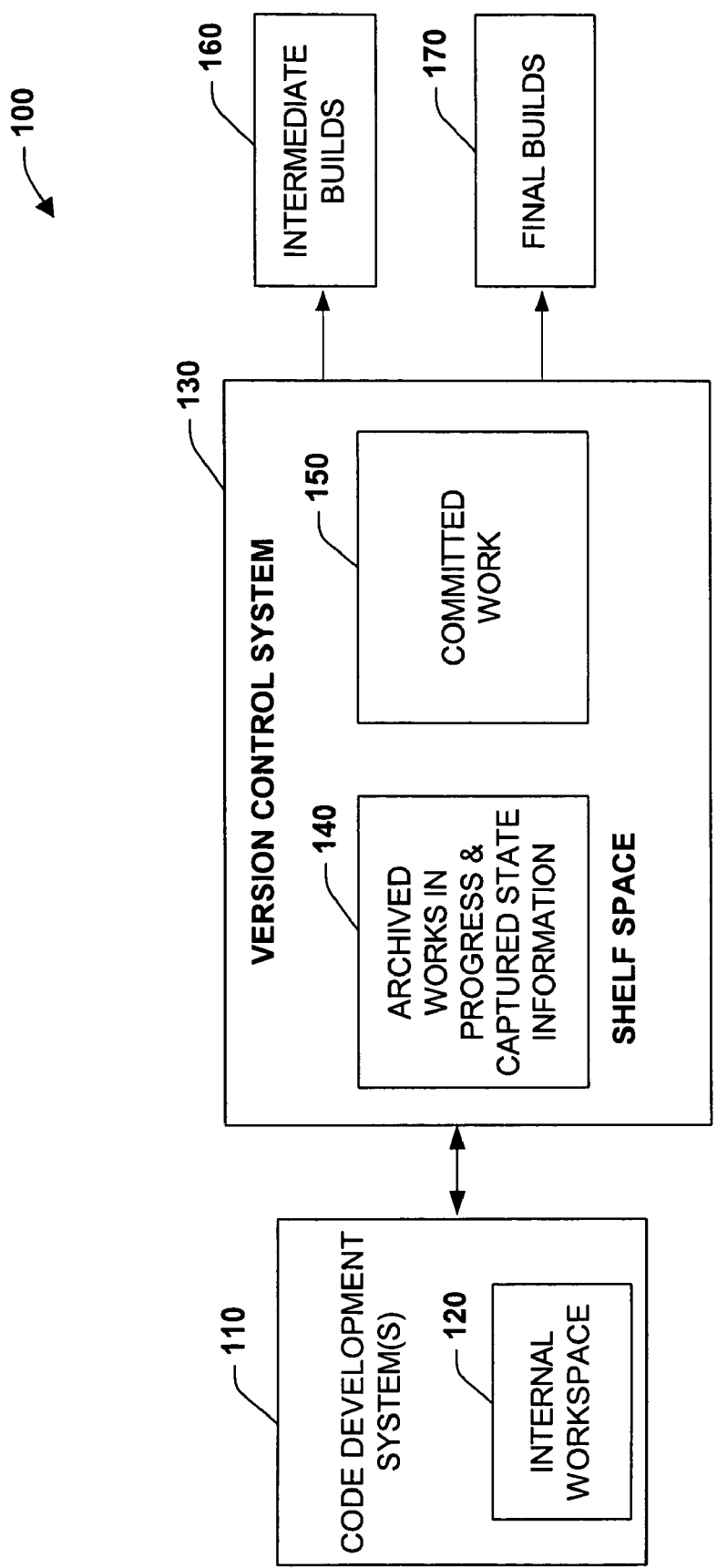
FIG. 1 is a schematic block diagram of a software development system in accordance with an aspect of the present invention.

Referring initially to FIG. 1, a software development system 100 is illustrated in accordance with an aspect of the present invention. The system 100 includes one or more code development systems 110 (CDS) that is employed by a developer to design software applications and is generally operated on a local client computer (e.g., Visual Studio operating on a developer workstation). The CDS 110 is associated with an internal storage space 120 that holds intermediate or non-finalized versions of code that may be under development. Code or software developed in the internal space 120 can be transferred to a version control system 130 or server and stored as archived works in progress in a shelf space 140 or memory along with related state information describing the developer's workspace and/or file under development and is described in more detail below with respect to FIG. 2.

Other space in the version control system 130 includes committed work 150 or files that are generally checked in as finalized versions of substantially debugged code. After a work in progress has been checked into the shelf space 140 or committed work at 150, the version control system 130 enables authorized users to check out respective versions of code to produce intermediate versions or builds of software at 160 in cases that utilize the shelf space 140 or final versions or builds of software at 170 in cases that build from work in the committed space 150. Although, the system 100 is generally configured as a client/server configuration between the CDS 110 and the version control system 130, it is to be appreciated that other distributed arrangements are possible. For example, rather than storing archived works in progress in the shelf space 140 in a centralized server 130, the CDS systems 110 can maintain local versions of the shelf space 140 and utilize communications and synchronization mechanisms between clients to facilitate that intermediate versions are exposed in a controlled manner to authorized users of such versions.

In general, Shelving is the process of capturing the current state of the internal or private workspace 120 and archiving that to the version control system 130 without performing a formal commit or check-in process at the version control system. This state can be employed at a later time to reproduce all or portions of the workspace state as desired by the user. When shelving changes, the user or developer can decide whether to preserve the changes in the private workspace or revert those files to their unaltered versions. Thus, Shelving provides solutions for at least the following:

Allowing developers to set aside work in a manner that can be easily restored at a later time without committing work to the version control system repository at 150 and thereby making it available for other team members.

Enables checkpoints for current work so that it can be restored later on if desired to revert the changes.

Allows for easily backing up changes currently made in case of a local system failure.

Allows sharing work in progress with a coworker without committing it and thus making it available for other coworkers.

Allows moving work in progress to another workspace where it may be more convenient to continue.

Another aspect to the shelving concept is the act of "unshelving" which involves restoring the private workspace 120 to the state that was previously archived. The act of unshelving allows removing the state that is stored on the server or to preserve the changes shelved on the server so they are available for unshelving by other users. Shelving and unshelving are described in more detail below with respect to FIGS. 2-6.

Figure 2:
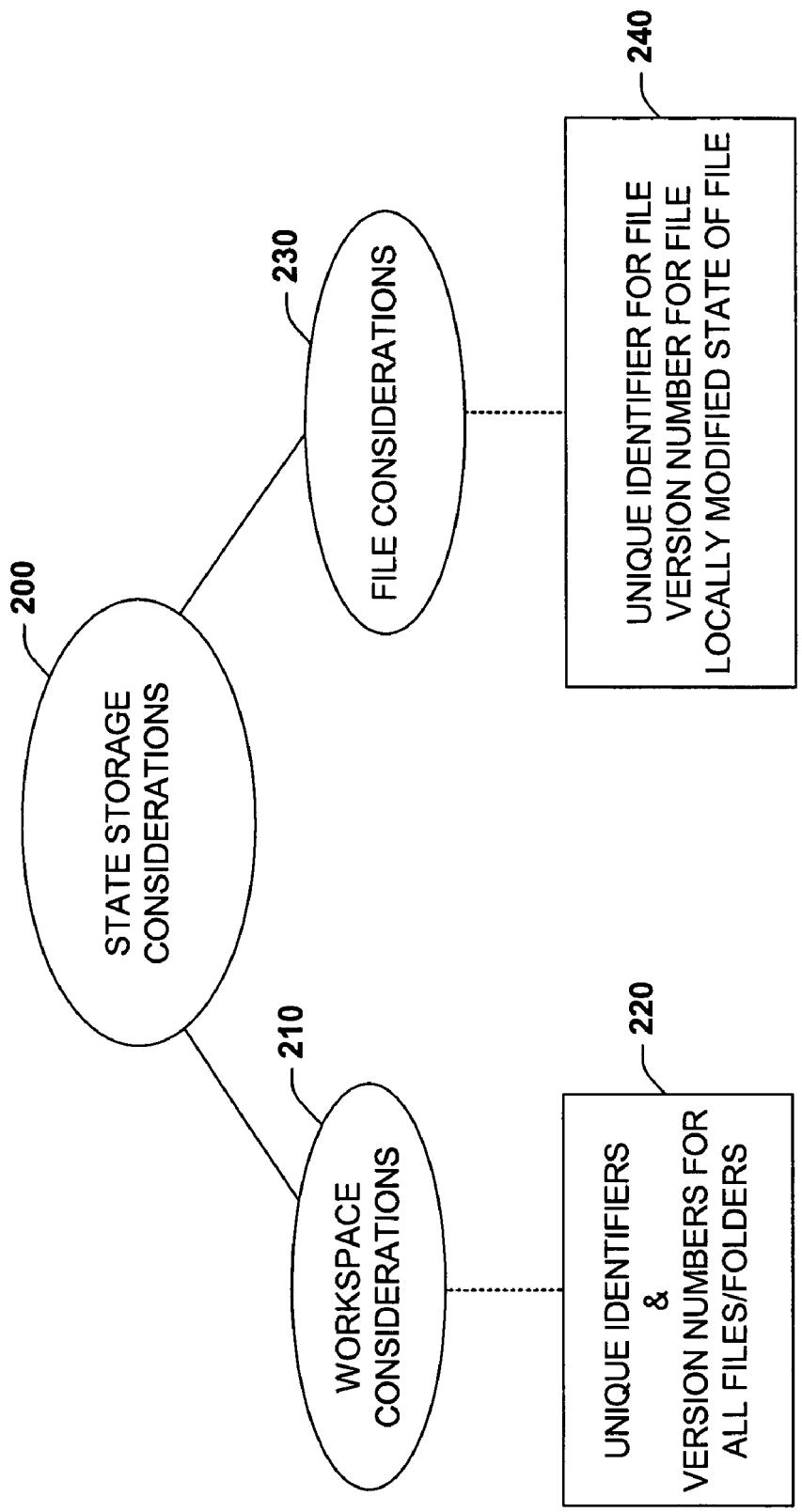
FIG. 2 is a diagram illustrating state storage considerations in accordance with the present invention.

Referring now to FIG. 2, file and workspace state storage considerations 200 are illustrated in accordance with the present invention. Typically, Shelving can be implemented by storing private workspace state on a server. Thus, global states for the workspace may be stored as well as state specific to the individual files being stored at 210. If the shelve operation retains version information for all files and folders in the workspace, the following workspace state(s) can be stored at 220:

The unique identifier for all files/folder in the workspace.

The version number of each file/folder in the workspace.

For each modification of files in the workspace that is to be shelved at 230, the following state(s) can be stored at 240:

The unique identifier for the file.

The number of the version that was modified to create the current state.

The locally modified state of the file.

As noted above, the captured state can be stored at a server (or servers), or optionally in a client-side archive and manifested as an object available for "unshelving" at a later time. The unshelving process generally involves restoring the modified files in the private workspace. Additionally, meta-data associated with the state of the workspace is restored. The meta-data can include version information about the files that are contained in the workspace and data regarding the types of changes which are pending within the workspace.

Figure 3:
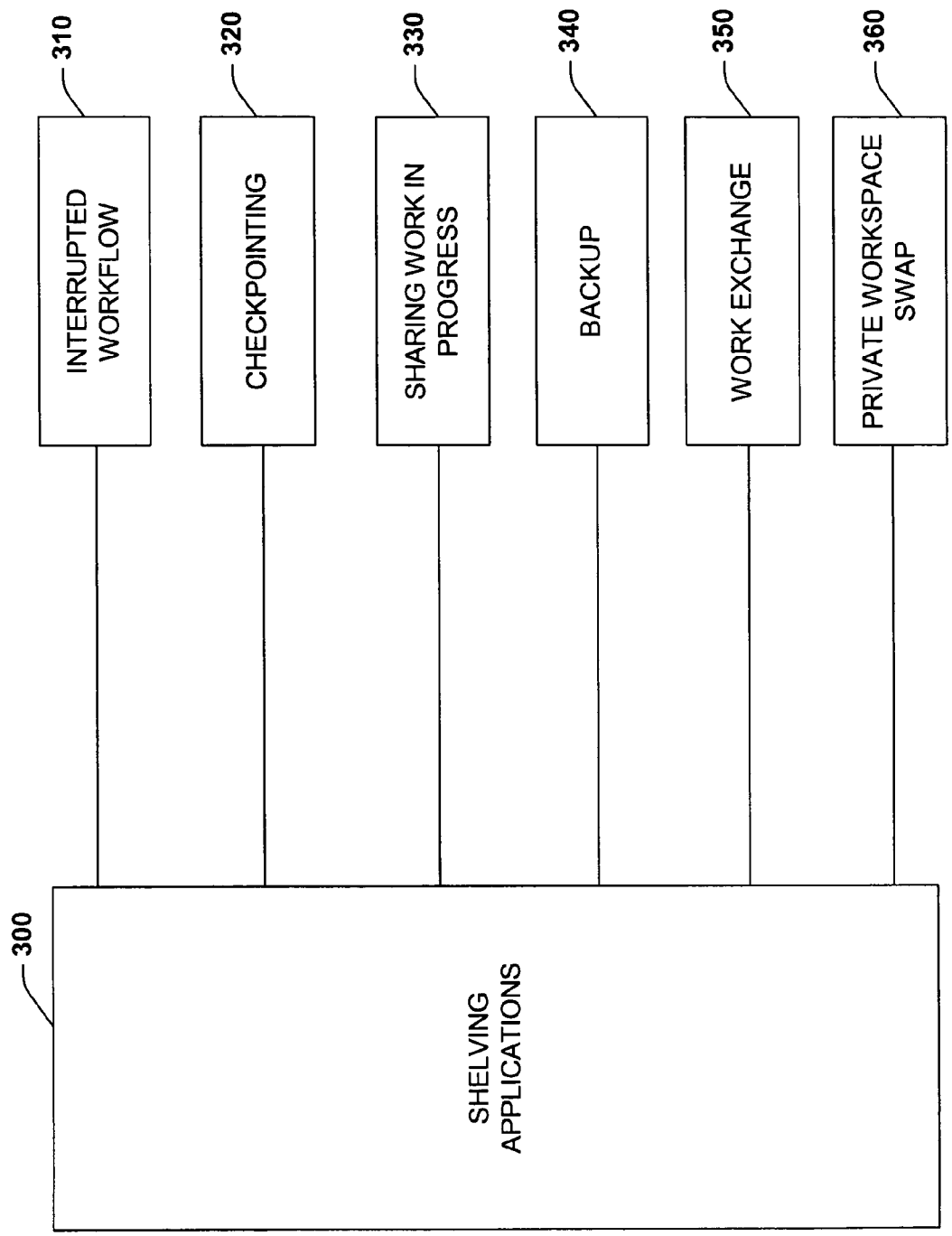
FIG. 3 is a diagram illustrating shelving applications in accordance with the present invention.

FIG. 3 illustrates various shelving applications 300 in accordance with an aspect of the present invention. Shelving enables one or more of the following applications 400 for software developers and other workers involved in creating electronic content that has a significant lifetime (more than a few weeks), continually evolves over its lifetime, or is of high asset value.

An Interrupted workflow situation 310 occurs when a developer working on a new feature for an application is asked to divert their attention to a high priority bug that needs to be addressed, for example. To preserve the current work in progress, while not mixing the feature work with the work required to fix the bug, the developer decides to shelve the work in progress and restore the files to their unmodified state.

A Checkpointing situation 320 may occur when a developer who is working on a task that will take several days reaches a state of intermediate stability and would like to preserve the current file state without submitting the changes for general availability. They decide to shelve the work in progress and preserve the modifications in the private workspace so they can continue working. If at some future time, they determine that their private workspace has deviated far from stability and would like to return to the intermediate stability previously achieved, they can unshelve the changes back into the private workspace.

Sharing work in progress at 330 may occur when two or more developers are working on related features and need to share their work on a more frequent basis than they can achieve by waiting for the desired stability for submission as committed work. These developers may be comfortable with assuming the risk associated with accepting each other's work in progress. When the time comes for them to share work, the contributor may shelve their work and preserve the changes in their private workspace. The developer who consumes the work can then unshelve the changes into their respective private workspace.

In a Backup example 340, a developer who is leaving for the day yet is not ready to submit their work in progress may decide to shelve the work in progress to the server in the event that a system failure causes the private workspace to not be available upon returning. The shelved changes create a backup of the work in progress, and any nightly backup process for the version control system also creates a redundant backup.

In a work exchange example 350, a developer that is handing off work in progress to another developer can decide to shelve their work and allow other developer to unshelve it into their own private workspace. They may also decide to restore their private workspace to unaltered versions of the files as they may no longer be working on that respective task.

In a private workspace swapping situation 360, a developer has been working on a desktop machine and may desire to take their work in progress on a laptop. Thus, they may desire to shelve their work to the server and then unshelve it into a private workspace on the laptop.

Figure 4:
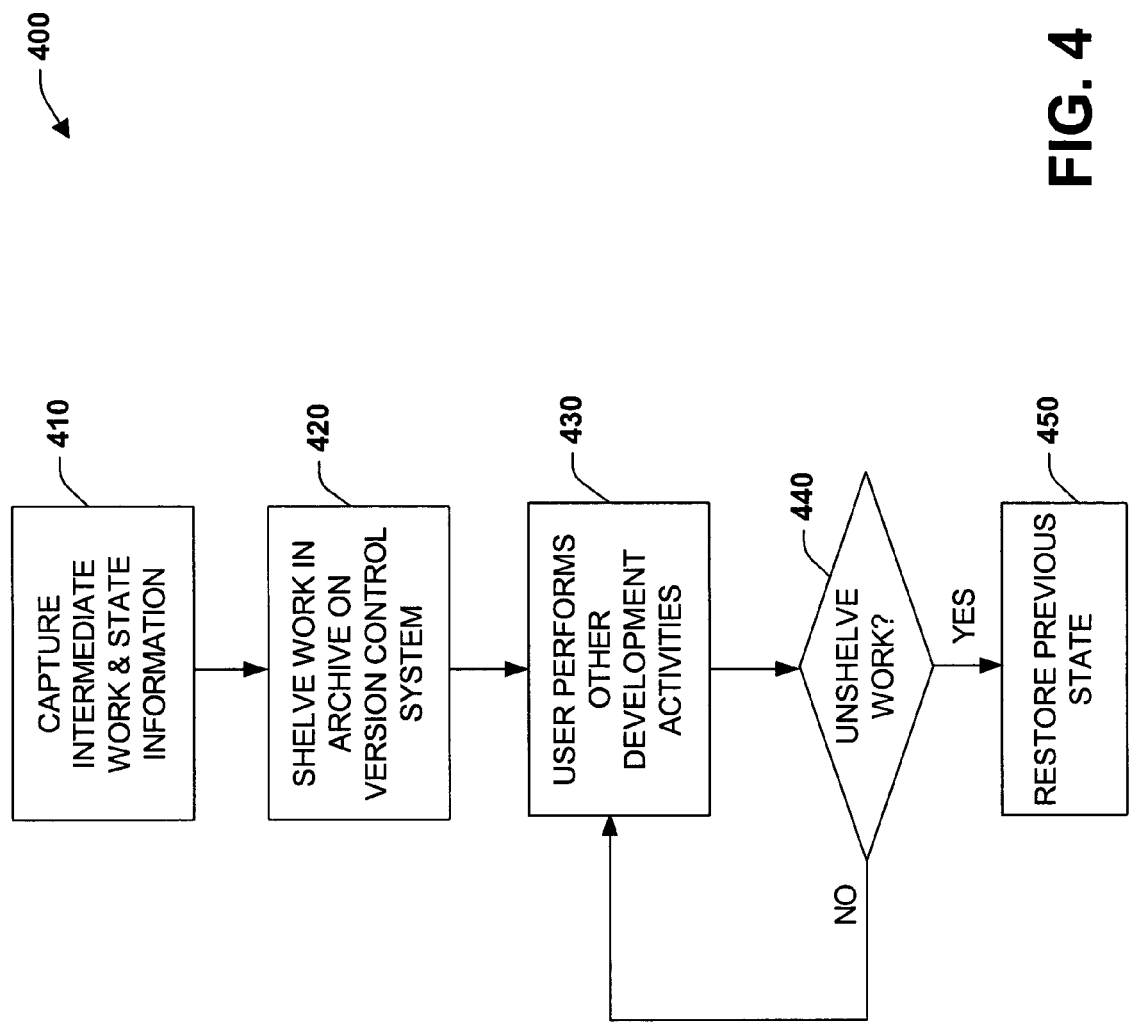
FIG. 4 is a flow diagram illustrating code development aspects in accordance with an aspect of the present invention.

FIG. 4 is a flow diagram illustrating code development processing in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 410, intermediate work in progress and associated state information is captured. As noted above, this may include capturing intermediate versions of software or code in a local development system(s) or workstation(s) operated by one or more users. At 420, the intermediate work is shelved in an archive on a version control system, wherein the archive is generally controlled as a separate space from work that has been committed to the system. As will be described in more detail below, one or more commands associated with a user interface can be provided to enable shelving of code or software to be shelved. At 430, after shelving the intermediate work, the developer can perform other development activities such as working on someone else's code, fixing a bug, or submitting work for backup. At 440, a decision is made as to whether or not to unshelve or restore the state of the previously shelved work. If so, the process proceeds to 450 and restores the developers current operating environment and code state to the previous version before shelving took place. If not, the process proceeds back to 430 for subsequent development activities. As will be described in more detail below, one or more commands associated with a user interface can be provided to enable unshelving of code or software that has been shelved.

Figure 5:
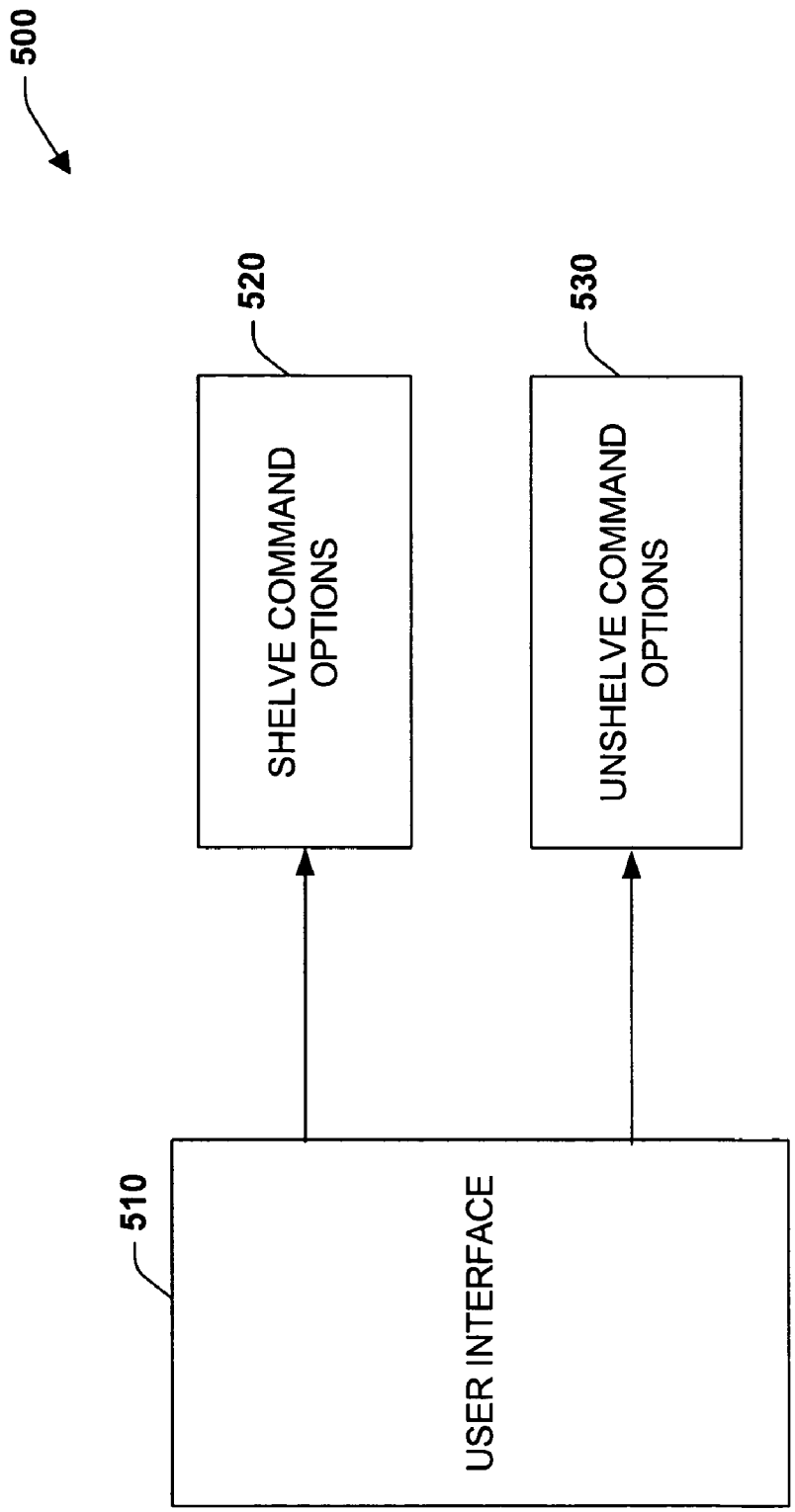
FIG. 5 is a diagram illustrating user interface command options in accordance with an aspect of the present invention.
Figure 6:
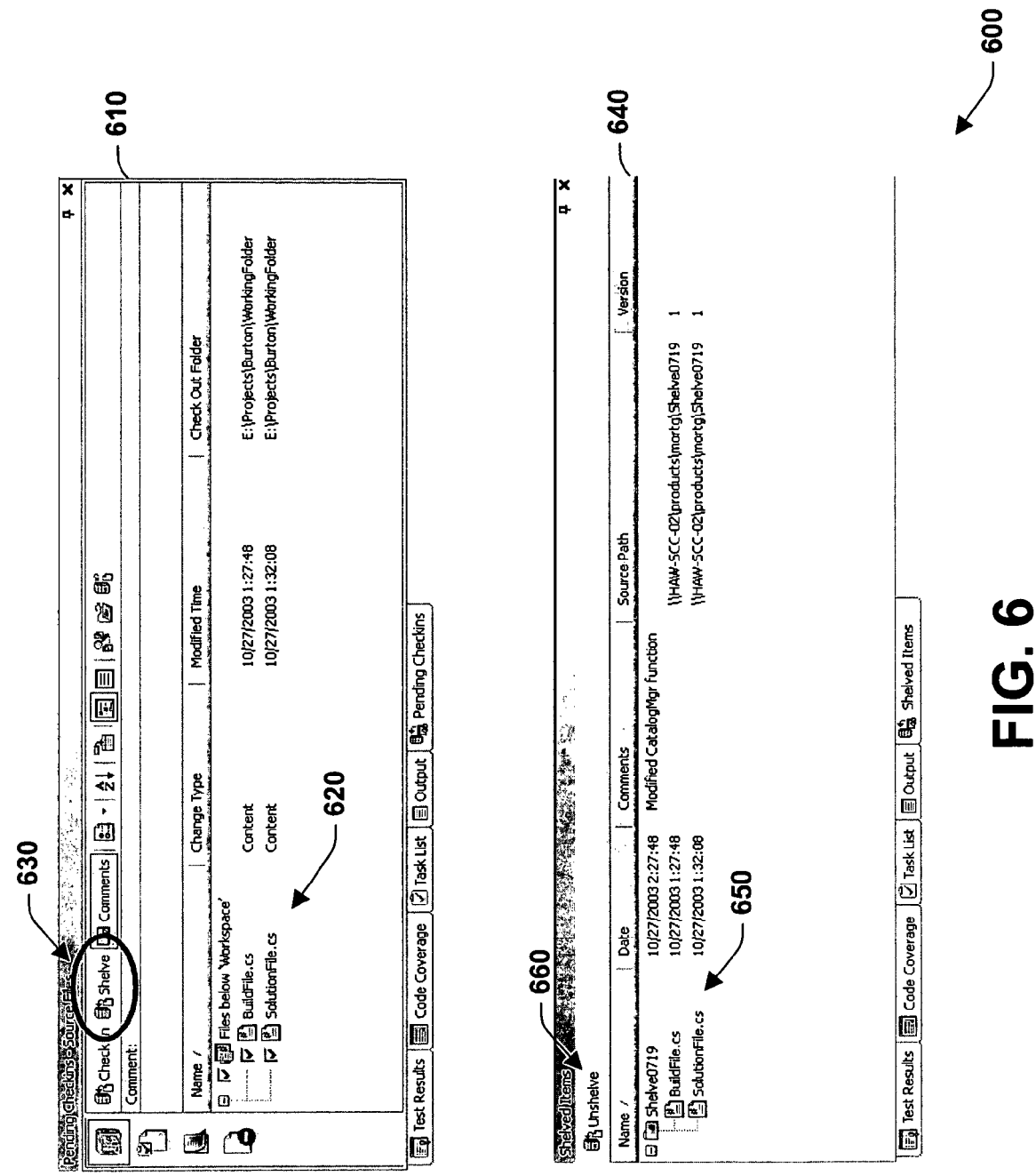
FIG. 6 is a diagram illustrating exemplary user interface aspects in accordance with an aspect of the present invention.

FIG. 5 illustrates command options 500 in accordance with an aspect of the present invention. It is noted that the commands and user interface options depicted in FIGS. 5 and 6 are provided as example implementations and that it is to be appreciated that various other commands, names, displays, and/or options can be provided to shelve and unshelve development work in accordance with the present invention. At 510, a user interface is provided to facilitate shelving and unshelving. The interface may be associated with a software development tool, whereby menu commands are provided to designate files to be shelved or unshelved, for example. As illustrated, the user interface 510 may include one or more shelve command options 520 and one or more unshelve command options 530.

With respect to the shelve options 520, the shelve command can be employed to store pending changes on the server without committing it. This may include an associated command line having one or more of the following examples:

| | |
|---|---|
| shelve | [/preserve] [/workspace:workspace] |
| | [/replace:(yes\|no)] |
| | [/comment:(@commentfile\|"comment")] |
| | [/file] [shelved-archive-name] |
| | wherein: |
| /preserve | Leaves changes in the current workspace. |
| /workspace | Specifies the name of the workspace in which the changes should be shelved. |
| /replace:yes\|no | If yes, instructs system to replace any existing shelved archive with the same name. If this flag is not specified, the user is prompted should a conflict occur. |
| /snapshot | In addition to archiving pending changes, preserve base version info for all items in the workspace. |
| /comment | Specifies a comment describing the shelved changes. |
| /file | Specifies that the shelved archive name is a file path. |
| shelved-archive-name | What to call the shelved archive on the server. Name is unique for this user. If omitted, the default is the workspace name. |

EXAMPLES

| | |
|---|---|
| shelve new-feature | Stores the pending changes to the server under the name "new-feature". |

As noted above, the shelve command 520 can be used to remove pending changes from a user's workspace and store them on a server(s). Pending changes are stored on the server along with the file version numbers they are based on. Generally, unless /preserve is specified, the pending changes are removed from the user's workspace, putting the workspace back into the state it was after a last get command. Pending adds are generally deleted and pending deletes are re-added. Files with pending edits are re-fetched, restoring the original version, timestamp, and read-only flag.

It is noted that "base" version numbers of files in a shelved archive item can be stored on the server. Alternatively, instead of storing file contents, differences between files can be stored on the server.

Offline Usage

When offline, shelving usually performed on a file (the /file option).

Error Conditions

If there is already a shelved archive with the same name, the command can be set to fail.

Exit Codes

| | |
|---|---|
| 0 | All changes shelved successfully |
| 1 | One or more changes failed, but at least one was successful |
| 100 | All changes failed |

Security Considerations

A newly created shelved archive can have the current user as an owner. This can cause the user to be granted Modify and Delete permissions on the archive's Access Control List (ACL). Generally, to shelve to a file, the user should have appropriate file system permissions for the destination file. For shelve to server and shelve to file, the user should have ModifyAndDelete permission if the changes are to be removed from the workspace.

With respect to the unshelve options 530, the unshelve command is generally used to restore shelved changes that have been stored on the server using a shelve command.

Command Line

| | |
|---|---|
| unshelve [/file:filename] [/preserve] [shelved-archive-name[;username]] | |
| /file | Specifies that the shelved archive name is a file path. Implies/preserve. |
| /preserve | Causes the archive to not be removed from the server. |
| shelved-archive-name | The name of the shelved archive to restore. |
| username | The name of the user who created the archive. Used to access another user's shelved changes. |

EXAMPLES

| | |
|---|---|
| unshelve | Unshelves the default shelved changes into the local workspace. |
| unshelve/preserve foo | Unshelves the shelved archive named "foo" and keeps the shelved changes on the server. |
| unshelve/file c:\foo.zip | Unshelves the changes from the file "c:\foo.zip". |

The unshelve command 530, restores shelved changes to the current workspace. Pending changes are re-added to the local workspace. For each checked out file, the workspace is re-synchronized to the version the edit was based on. The edit can be reapplied and the file is made writeable. For each pending delete, the local file is deleted and for each pending add, the local file is readded. If the archive was created with the /snapshot option of the shelve command, all files in the workspace can be synchronized with the corresponding versions that existed in the workspace when the archive was created. A user may unshelve another user's change by appending the username to the shelved archive name. If the archive belongs to the current user, it can be deleted from the server unless /preserve is specified. Other users' archives can be automatically preserved. If changes are unshelved to a workspace that contains other changes, a merge can be performed. This is similar to performing a get with pending changes.

For reliability reasons, the unshelve command may use the following semantics:

1. Client calls server to initiate unshelve command.
2. Server verifies filelist is valid for changes that are in the workspace.
3. Server returns list of changes (filenames and versions. Shelved versions have a special version identifier that is not usable by users).
4. For each file:
    Client syncs file using special version ID
    Client adds checkout record to server
    Client performs merge
5. Client calls server to delete shelved archive (unless /preserve is specified). Generally, item 4 should be as close to "get" operation semantics as possible.

Offline Usage

When offline, the unshelve command may be used to unshelve file archives.

Error Conditions

If any part of the archive to be unshelved does not exist in the current workspace, the entire unshelve operation is aborted.

If /preserve is not specified and the user does not have permission to delete the archive, a warning can be issued. The changes are still unshelved, but the shelved archive is not deleted.

| Exit Codes | |
|---|---|
| 0 | All changes unshelved successfully |
| 100 | An error occurred |

Security Considerations

Generally, the user should also have Read access to all of the files/folders being unshelved. Changes to any files/folders for which the user does not have permission will be skipped and a warning produced. The user should have a Delete permission or an AdminShelvedChangesets global permission to delete the archive. If the user does not have this permission and has not passed /preserve, a warning is generated that the delete could not occur. In addition, the user should own the workspace or have a global AdminWorkspaces permission.

FIG. 6 illustrates example user interfaces 600 in accordance with an aspect of the present invention. As noted above, these interfaces are merely exemplary in nature and illustrate one possible implementation. For example, the interfaces 600 may include one or more display objects that include such aspects as configurable icons, buttons, sliders, input boxes, selection options, menus, tabs and so forth having multiple configurable dimensions, shapes, colors, text, data and sounds to facilitate operations with the interface 600. In addition, user inputs associated with the interface 600 can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the user interface 600. An interface 610 depicts files listed in a workspace 620 that can be shelved via a shelve command 630. An interface 640 depicts files listed in an archive or shelf 650 that can be unshelved via an unshelve command 660.

Figure 7:
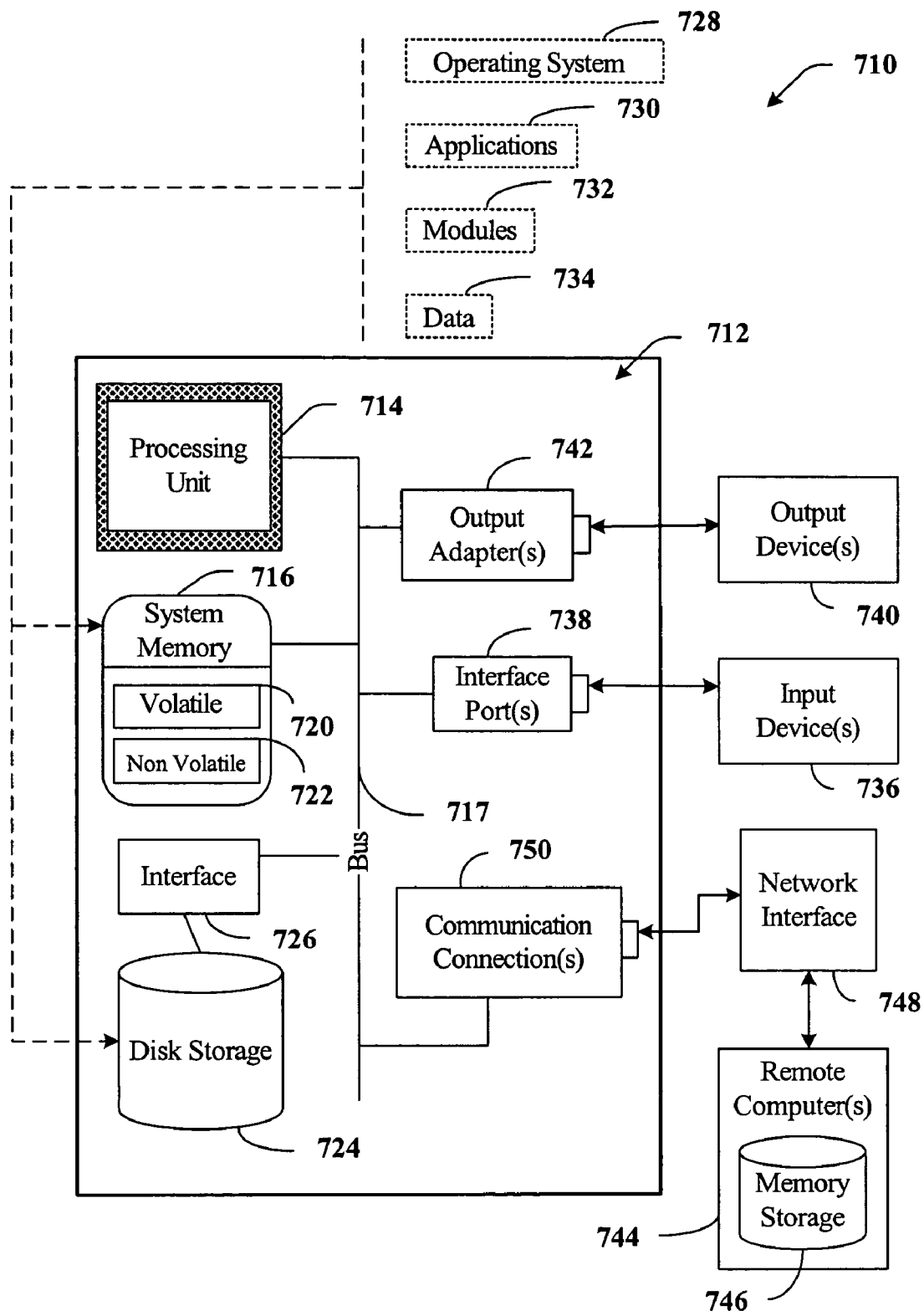
FIG. 7 is a schematic block diagram illustrating a suitable operating environment in accordance with an aspect of the present invention.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
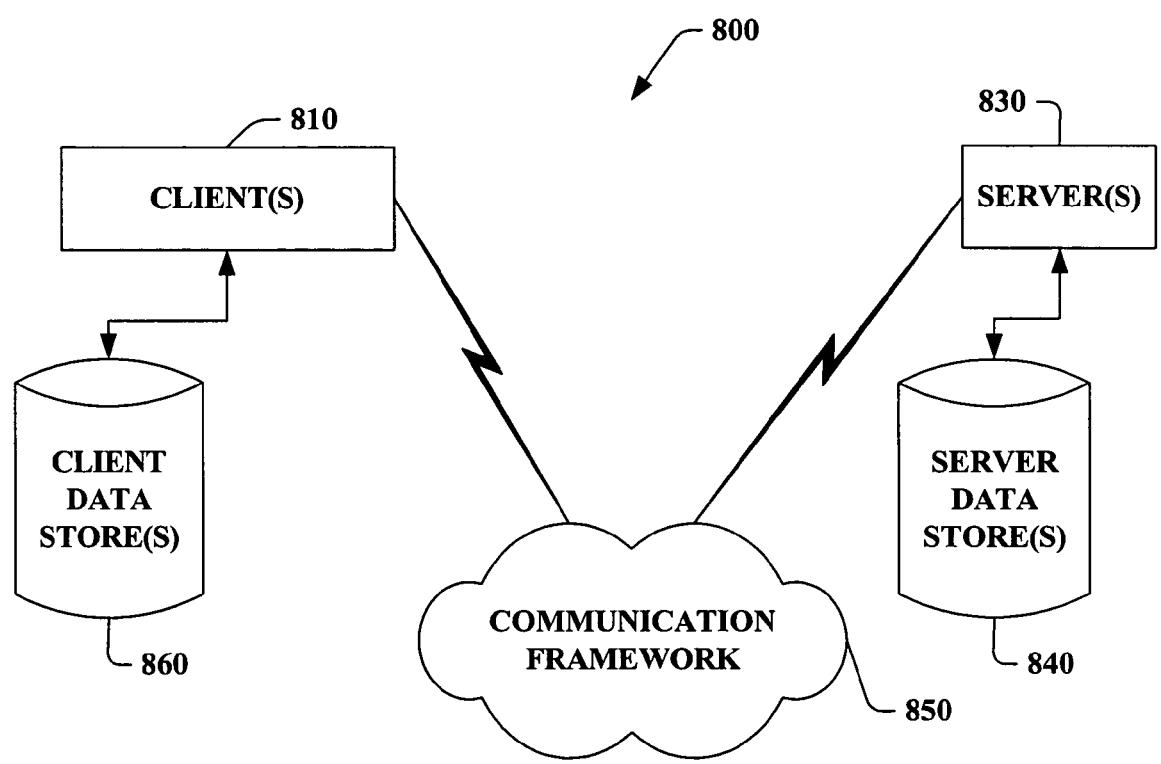
FIG. 8 is a schematic block diagram of a sample-computing environment with which the present invention can interact.

FIG. 8 is a schematic block diagram of a sample-computing environment 800 with which the present invention can interact. The system 800 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the present invention, for example. One possible communication between a client 810 and a server 830 may be in the form of a data packet adapted to be transmitted between two or more computer processes. The system 800 includes a communication framework 850 that can be employed to facilitate communications between the client(s) 810 and the server(s) 830. The client(s) 810 are operably connected to one or more client data store(s) 860 that can be employed to store information local to the client(s) 810. Similarly, the server(s) 830 are operably connected to one or more server data store(s) 840 that can be employed to store information local to the servers 830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A software development system embodied on a computer readable storage medium, comprising:

a shelving component that captures a current state of an intermediate software design containing pending changes developed on a private workspace and stores the captured state to a version control system without a formal commit or check-in to the version control system, the shelving components stores the pending changes to the version control system to either a shelf space or a committed work space, wherein user selection of a preserve option associated with the shelving component causes the pending changes to be maintained on the private workspace when the intermediate software design is archived, and leaving the preserve option unselected causes the pending changes to be removed from the software design on the private workspace after the current state has been captured, the version control system processing the intermediate software design as a completed software design; and an unshelving component that enables authorized users to retrieve respective versions of code captured by the shelving component to a private workspace to produce intermediate versions or builds of software in cases that utilize the shelf space, or final versions or builds of software in cases that utilize the committed work space, the captured intermediate software design is deleted from the version control system when the retrieval is initiated by an owner of the intermediate software design, and the captured intermediate software design is preserved on the version control system when retrieval is initiated by a non-owner of the software.

2. The system of claim 1, further comprising one or more code development systems that are employed by a developer to design software applications.

3. The system of claim 1, the shelving component is executed on at least one of a local development system or a centralized server or servers.

4. The system of claim 1, the version control system includes committed work or files that are generally checked in as finalized versions of code.

5. The system of claim 1, the shelving component is employed for at least one of an interrupted workflow application, a checkpoint application, a shared work application a code backup application, a work exchange application, or a private workspace exchange application.

6. The system of claim 1, the unshelving component that restores the private workspace to a state that was previously archived.

7. The system of claim 6, the unshelving component allows removing the state that is stored on a server or preserving changes shelved on the server in order that the changes are available for unshelving by other users.

8. The system of claim 6, the unshelving component merges unshelved changes with changes pending on the private workspace when an unshelve operation is initiated.

9. The system of claim 1, further comprising a component to store state information for all files or folders in the private workspace or for individual files in the private workspace.

10. The system of claim 9, the state information for all files and folders includes at least one of a unique identifier for all files and folders in the workspace or a version number of each file or folder in the workspace.

11. The system of claim 9, the state information for individual files includes at least one of a unique identifier for an individual file, a number of a version that was modified to create a current state, or a locally modified state of a file.

12. The system of claim 9, further comprising storing metadata that is associated with the state information.

13. A code development system embodied on a computer-readable storage medium, comprising:
   means for developing pending changes on non-finalized software on a private workspace;
   means for archiving the non-finalized software with pending changes to a version control system without a formal commit or check-in to the version control system;
   means for capturing one or more states associated with the non-finalized software to one of a shelf space or p committed work space;
   means for maintaining the pending changes on the private workspace after archival when a preserve option is selected;
   means for removing the pending changes from the non-finalized software on the private workspace upon archival when the preserve option is not selected;
   means for processing the archived non-finalized software along with finalized software on the version control system;
   means for retrieving versions of the archived software to a private workspace to produce either intermediate versions of the software in cases that utilize the shelf space or final versions of the software in eases that utilize the committed work space;
   means for deleting the archived software from the version control system when the retrieval is initiated by an owner of the non-finalized software; and
   means for preserving the archived software from the version control system when the retrieval is initiated by a non-owner of the non-finalized software.

14. The system of claim 13, further comprising means for restoring the states and the non-finalized software to a previous state.

15. A method to facilitate code development, comprising:
   creating a version of software in a private development system;
   automatically determining at least one state for the software;
   shelving the software and the state on a version control system to one of a shelf space or a committed work space without a formal commit or check-in to the version control system; and
   maintaining the pending changes on the private development system after shelving when a preserve option is selected;
   removing the pending changes from the software on the private workspace after shelving when the preserve option is not selected;
   unshelving the version of software to a private workspace in accordance with the state, the version of software is deleted from the version control system when unshelving is initiated by an owner of the software, and the version of software is preserved on the version control system when unshelving is initiated by a non-owner of the software;
   producing an intermediate version of the software on the private workspace when the unshelving is performed on software shelved to the shelf space; and
   producing a final version of the software on the private workspace when the unshelving is performed on software shelved to the committed work space.

16. The method of claim 15, unshelving the version of software to a private workspace that contains other pending changes causes the pending changes to be merged with the unshelved version of software.

17. The method of claim 15, further comprising providing at least one of a shelving command and an unshelving command to facilitate development of the software.

18. The method of claim 17, the shelving command is associated with at least one of a preserve option, a workspace option, a replace option, a comment option, a file option, an error condition, or an exit code.

19. The method of claim 17, the shelving and the unshelving commands are associated with at least one security parameter.

20. The method of claim 17, the unshelving command is associated with at least one of a preserve option, a file option, a name option, a username option, an error condition, or an exit code.

21. A user interface embodied on a computer-readable storage medium for archiving intermediate versions of code, comprising:
   a display component to highlight one or more files on a private workspace to archive on a version control system, the files contain pending changes associated with an intermediate version of code;
   a shelving command input to enable users to archive the intermediate files with pending changes to one of a shelf space or a committed work space in a version control system without a formal commit or check-in to the version control system, wherein archiving removes the pending changes from the intermediate files on the private workspace when a preserve option associated with the shelving command is not selected, and maintains the pending changes on the private workspace when the preserve option is selected; and
   an unshelving command input that enables authorized users to retrieve the archived files to a private workspace to produce intermediate versions or builds of the software in cases that utilize the shelf space, or final versions or builds of the software in cases that utilize the committed work space, wherein the archived files are deleted from the version control system when the unshelving command is initiated by an owner of the archived files, and the archived files are preserved on the version control system when unshelving command is initiated by a non-owner of the archived files.

* * * * *